United States Patent
Logan et al.

(10) Patent No.: US 6,234,543 B1
(45) Date of Patent: May 22, 2001

(54) DEVICE AND METHOD FOR COUPLING A RIGID PIPE TO A FLEXIBLE HOSE

(76) Inventors: Dan T. Logan, 260 La. 650 BB Snow Lake, Freemont, IN (US) 46737; Walter J. Matt, 900 Eagle Bend Rd., Clinton, TN (US) 37716; Steven E. Yates, 2912 Homestead Ct., Ft. Wayne, IN (US) 46804; Wallace B. Morehouse, 503 Mariner Point, Clinton, TN (US) 37716

( * ) Notice: Subject to any disclaimer, the term of this patent is extended or adjusted under 35 U.S.C. 154(b) by 0 days.

(21) Appl. No.: 09/311,090

(22) Filed: May 13, 1999

Related U.S. Application Data

(63) Continuation-in-part of application No. 09/212,659, filed on Dec. 16, 1998, now abandoned.

(51) Int. Cl.[7] .................................................. F16L 33/00
(52) U.S. Cl. ............................................ 285/256; 285/258
(58) Field of Search ............................ 285/258, 141.13, 285/141.16, 141.17, 259, 256, 242; 138/109

(56) References Cited

U.S. PATENT DOCUMENTS

| | | |
|---|---|---|
| 1,962,060 | 6/1934 | Emery, Jr. . |
| 2,147,355 | * 2/1939 | Scholtes ............................ 285/258 |
| 2,216,839 | * 10/1940 | Hoffman ............................ 285/258 |
| 2,295,840 | * 9/1942 | Grint ................................. 285/259 |
| 2,479,702 | * 8/1949 | Rood ................................. 285/259 |
| 2,485,049 | * 10/1949 | Hallisy .............................. 285/288 |
| 2,686,066 | 8/1954 | Pacquin . |
| 2,902,299 | * 9/1959 | Turner ............................... 285/258 |
| 3,211,476 | 10/1965 | Wagner . |
| 3,525,542 | 8/1970 | Belart et al. . |
| 3,540,486 | 11/1970 | Flounders . |
| 3,924,883 | 12/1975 | Frank . |
| 4,114,656 | 9/1978 | Kish . |
| 4,330,142 | 5/1982 | Paini . |
| 4,611,832 | 9/1986 | Matsuoko et al. . |

(List continued on next page.)

FOREIGN PATENT DOCUMENTS

| | | | | |
|---|---|---|---|---|
| 630903 | * 11/1961 | (CA) | .............................. | 285/256 |
| 188791 | * 7/1989 | (JP) | .............................. | 285/256 |
| 4181089 | * 6/1992 | (JP) | .............................. | 285/256 |

OTHER PUBLICATIONS

Parker Parkrimp puts the bite on the braid, Parker Fluid Connectors, Bulletin #4480 B–1, May 1980.
*Couplematic*, Couplematic, Inc. No. 66.
*Stratoflex Crimp Catalog*, Stratoflex, Inc., 1987.
*Fauver Industrial Hose*, J.N. Fauver Co., Inc., Cat. No. HC 65.

Primary Examiner—Teri Pham Luu
(74) *Attorney, Agent, or Firm*—Pitts & Brittian, PC

(57) ABSTRACT

A device and method for coupling a rigid pipe to a flexible hose. The device for coupling a rigid pipe to a flexible hose is designed for use in low pressure applications whereby fluid communication between the rigid pipe and the flexible hose is prevented. The coupling of the present invention includes a clamping ring. After assembly of the coupling using the method of the present invention, a terminal end of the flexible hose is interposed between the terminal end of the rigid pipe and the clamping ring. Each of the rigid pipe and clamping rings is deformed to define cooperating annular rings, and to deform the flexible hose there between. Deformation of the flexible hose between the rigid pipe and clamping ring annular rings serves to form a seal to prevent fluid communication between the rigid pipe and flexible hose, and further prevents removal of the coupling. In an alternate embodiment, at least the rigid pipe is deformed to define a barbed annular ring. In another such embodiment, the clamping ring is likewise deformed. In still another embodiment, the clamping ring defines a knurled surface for increasing frictional resistance between the clamping ring and the flexible hose.

6 Claims, 7 Drawing Sheets

U.S. PATENT DOCUMENTS

| | | |
|---|---|---|
| 4,773,679 | 9/1988 | Hangebrauck . |
| 4,923,223 * | 5/1990 | Seckel ................................. 285/259 |
| 4,969,667 * | 11/1990 | Saueer ................................. 285/256 |
| 5,082,315 | 1/1992 | Sauer . |
| 5,190,323 | 3/1993 | Oetiker . |
| 5,199,751 | 4/1993 | Beagle et al. . |
| 5,207,460 | 5/1993 | Oetiker . |
| 5,295,718 | 3/1994 | Bartholomew . |
| 5,310,224 | 5/1994 | Tenglund . |
| 5,380,050 | 1/1995 | Sanders et al. . |
| 5,553,896 | 9/1996 | Woodward . |
| 5,775,740 | 7/1998 | Fukaya et al. . |
| 5,794,982 | 8/1998 | Green et al. . |

* cited by examiner

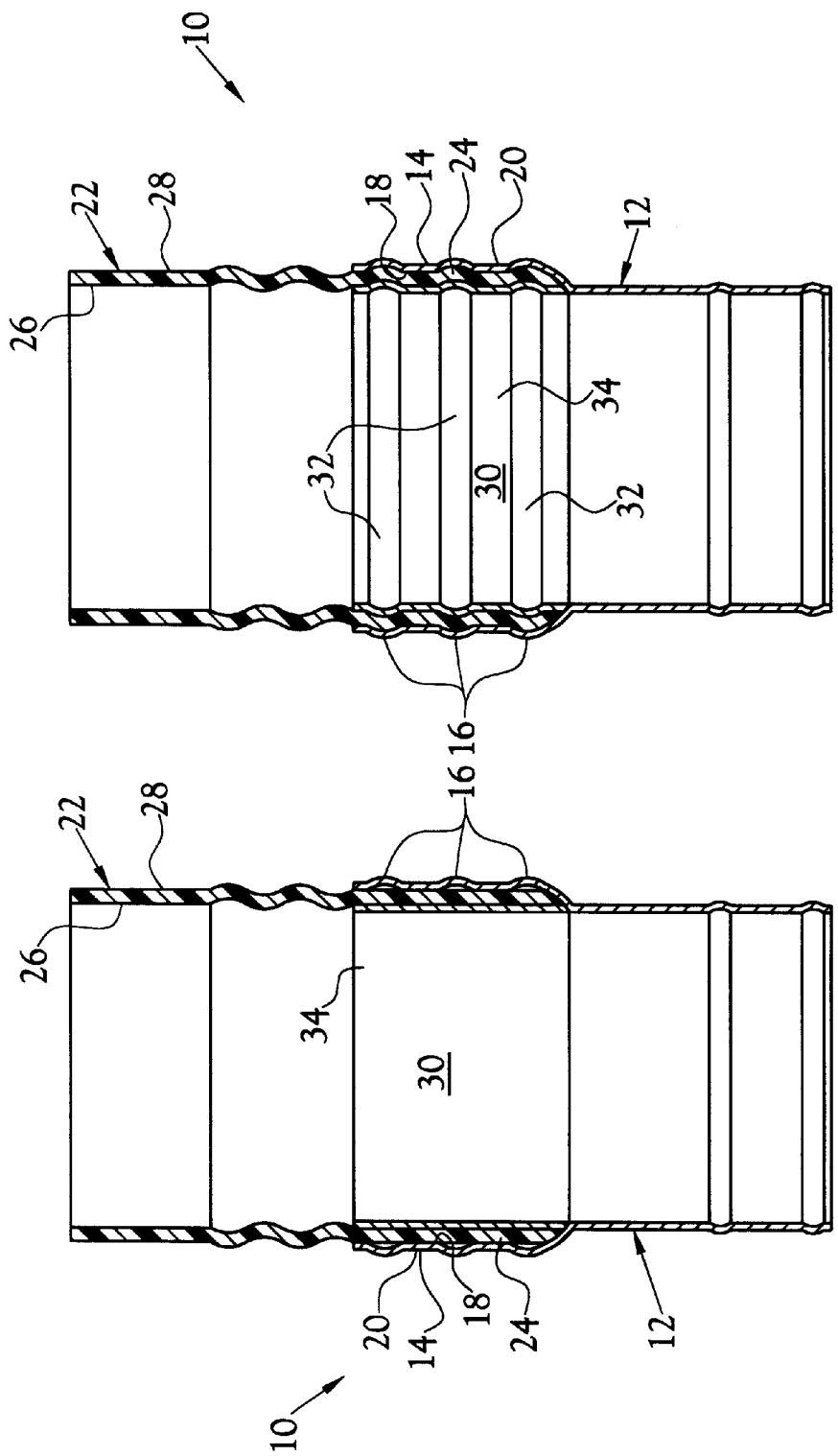

DEVICE AND METHOD FOR COUPLING A RIGID PIPE TO A FLEXIBLE HOSE

This application is a Continuation-In-Part of Ser. No. 09/212,659, filed on Dec. 16, 1998, abandoned.

TECHNICAL FIELD

This invention relates to the field of coupling devices and methods for making. More specifically, the present invention is related to a device and method for coupling a rigid pipe to a flexible hose.

BACKGROUND ART

In the field of coupling devices, it is well known that there are many ways to accomplish the coupling of two conduits. These methods vary not only for various applications such as low pressure versus high pressure, but also for the materials from which the two conduits are fabricated. For applications of coupling devices for coupling a rigid pipe, such as fi6ricated from a metal composite, to a flexible pipe, such as plastic or rubber, several different devices have been used heretofore. Typical of the art are those devices disclosed in the following United States Letters Patents:

| Patent No. | Inventor(s) | Issue Date |
| --- | --- | --- |
| 3,211,476 | J. B. Wagner | Oct. 12, 1965 |
| 5,190,323 | H. Oetiker | Mar. 2, 1993 |
| 5,207,460 | H. Oetiker | May 4, 1993 |
| 5,295,718 | D. D. Bartholomew | Mar. 22, 1994 |
| 5,380,050 | J. D. Sanders, et al. | Jan. 10, 1995 |
| 5,775,740 | K. Fukaya, et al. | July 7, 1998 |
| 5,794,982 | H. J. Green, et al. | Aug. 18, 1998 |

Of these patents, the '476 patent issued to Wagner discloses a method for securing a threaded coupling to the end of a flexible hose. A cup-shaped body is placed over the end of the flexible hose and defines an opening to cooperate with the opening of the hose. A tubular member defines an enlarged portion proximate one end and a threaded portion proximate the opposite end. The enlarged portion is inserted into the flexible hose leaving at least a portion of the threaded portion exposed. A tubular pressure element is then inserted over the tubular member up to the enlarged portion and into the flexible hose. A nut is then engaged with the threaded portion and tightened to draw the enlarged portion of the tubular member into the tubular pressure element. The cup-shaped body serves to retain the flexible hose as pressure is exerted by the tubular pressure element as a result of the nut being tightened. While being useful to secure a threaded nipple to the end of a flexible hose, the device taught by Wagner does not allow for the coupling of a rigid pipe to a flexible conduit.

Oetiker ('323) teaches a high pressure coupling specifically designed for use with hydraulic hoses of the type having inner and outer rubber layers and a reinforcement layer interposed therebetween. The '323 device includes a nipple structure which defines a number of annular ribs. An outer sleeve defines cooperating annular grooves. The nipple structure is inserted into the terminal portion of the hydraulic hose, and the outer sleeve is placed over the reinforcement layer of the hose. A portion of the outer rubber layer of the hose is removed. After the nipple structure and the outer sleeve are in place, the end of the outer sleeve is deformed to engage the nipple structure in order to maintain the device on the hose. However, the '323 device fails to teach a means for coupling a rigid pipe having no preformed deformations to a flexible conduit.

The '460 device, also taught by Oetiker, is a hose connection for high pressure installations. The '460 device includes an internal pipe over which is inserted a washer, and an outer sleeve. The outer sleeve is also received over the washer. The internal pipe is deformed to define a plurality of annular rings, the overall diameter being smaller than the internal diameter of the flexible hose to be coupled thereto. The hose is inserted over the internal pipe, into the outer sleeve, and to the washer. The internal pipe is then enlarged to engage the interior of the hose. The outer sleeve is then deformed to cover the washer at one end, and to define inward annular rings to cooperate with the deformations of the internal pipe. Specifically, the outward deformations of the internal pipe and the inward deformations of the outer sleeve alternate. This method of coupling the internal pipe to the flexible hose is complicated, especially in low pressure applications.

Bartholomew ('718) teaches a connector fitting positionable on the terminal end of a flexible conduit. The '718 device includes a first member positioned about the exterior surface of the terminal end of the conduit, and a second member positioned within the interior of the terminal end of the conduit. Once in position, the diameter of the second member is expanded to engage the interior surfitce of the conduit, and the terminal end of the first member is reduced to engage the outer surface of the conduit. The '718 device does not, however, teach a device for coupling a rigid pipe to a flexible conduit.

Sanders, et al. ('050), teach a coupling for a hose construction for use with a hose having an inner corrugated hose having inward projections. The '050 device defines an annular receptor for receiving the terminal end of the hose. A fitting defines a cooperating outer surface for being received by the corrugated inner surface of the hose, and an inner surface for cooperating with the interior wall of the coupling. Sanders, et al., do not teach a device for coupling a rigid pipe to a flexible conduit.

The '740 device disclosed by Fukaya, et al., teaches a structure for coupling a small-diameter thin metal tube to a pressure rubber hose. The metal tube is first fit with an inner tube and the two are deformed to define annular grooves. The rubber hose is then fit over the tube structure and is then caulked. Such a structure, by virtue of the requirement of caulking, is not an acceptable device for most coupling applications.

Green, et al. ('982), teach a device for coupling pipes with liners, the coupling device being provided with a liner. As in the '740 device above, the '982 device relies on a sealant compound to form a seal to prevent fluid communication between the coupler and the pipe or pipes into which the coupler is inserted. Green, et al., do not teach a device or method for coupling a rigid pipe to a flexible hose.

These prior art devices teach various methods for manipulating the end of a flexible hose, such as to provide a connecting terminal end, or to connect it to another conduit. However, the prior art discussed does not teach a simple method for coupling a rigid pipe to a flexible hose, while also providing a device which prevents fluid communication between the pipe and the hose. Further, this prior aft does not teach a device for coupling these components for low pressure applications.

Therefore, it is an object of this invention to provide a device for coupling a rigid pipe to a flexible conduit.

Another object of the present invention is to provide such a device for use in low pressure applications and for relatively large diameter pipes and conduits.

Yet another object of the present invention is to provide such a device whereby fluid communication between the rigid pipe and the flexible conduit is prevented.

Still another object of the present invention is to provide a method whereby such a device is fabricated and installed.

DISCLOSURE OF THE INVENTION

Other objects and advantages will be accomplished by the present invention which is designed for coupling a rigid pipe to a flexible conduit. The device for coupling a rigid pipe to a flexible hose is designed for use in low pressure applications whereby fluid communication between the rigid pipe and the flexible hose is prevented. The present invention also provides a method for fabricating and installing the coupling.

The coupling of the present invention includes a clamping ring. After assembly of the coupling using the method of the present invention, a terminal end of the flexible hose is interposed between the terminal end of the rigid pipe and the clamping ring. In one embodiment, the clamping ring is disposed within the interior of the flexible hose, which is received within the rigid pipe. Alternatively, the clamping ring is disposed on an exterior of the flexible hose, which receives the terminal portion of the rigid pipe.

In the first embodiment, the terminal portion of the rigid pipe defines an enlarged diameter for receiving the terminal end of the flexible hose. Prior to insertion of the flexible hose, the terminal portion of the rigid pipe is deformed to define at least one inwardly extending annular ring. After the rigid pipe annular rings are formed, the clamping ring is inserted into the terminal end of the flexible hose, and both are inserted into the rigid pipe terminal portion. The clamping ring is then deformed to defined at least one annular ring to cooperate with each rigid pipe annular ring. As the clamping ring is deformed, the flexible hose is engaged and deformed into the cooperating annular ring defined by the rigid pipe. Deformation of the flexible hose between the rigid pipe and clamping ring annular rings serves to form a seal to prevent fluid communication between the rigid pipe and flexible hose, and further prevents removal of the coupling.

A further alternative includes formation of the annular rings in both the rigid pipe and the clamping ring in an inward direction. In this embodiment, the annular rings are formed in the clamping ring prior to insertion in the flexible hose. The flexible hose is then inserted into the enlarged terminal portion of the rigid pipe, and the annular rings are then formed in the rigid pipe.

In yet other embodiments, at least the rigid pipe is deformed to define a barbed annular ring. In one such embodiment, the barbed annular ring is formed proximate the leading edge of the clamping ring, the trailing edge of the clamping ring being positioned proximate the terminal portion of the flexible hose. In another such embodiment, the clamping ring is likewise deformed. The barbed annular bead may be formed outwardly or inwardly in the latter embodiment, but is formed inwardly in the former embodiment.

In still another embodiment, the clamping ring defines a knurled surface for increasing frictional resistance between the clamping ring and the flexible hose.

The method of assembling the second embodiment, wherein the clamping ring is disposed on the exterior of the flexible hose, is similar to that of the first, with one of the rigid pipe and the clamping ring being deformed prior to assembly of the coupling, and the other being deformed after assembly. For annular rings formed inwardly, the rigid pipe annular rings are formed first. For annular rings formed outwardly, the clamping ring annular rings are deformed first.

BRIEF DESCRIPTION OF THE DRAWINGS

The above mentioned features of the invention will become more clearly understood from the following detailed description of the invention read together with the drawings in which:

FIG. 3 is a side elevation view, in section, of the device for coupling a rigid pipe to a flexible hose during assembly thereof;

FIG. 4 is a side elevation view, in section, of the device for coupling a rigid pipe to a flexible hose after assembly thereof;

BEST MODE FOR CARRYING OUT THE INVENTION

Figure 1:
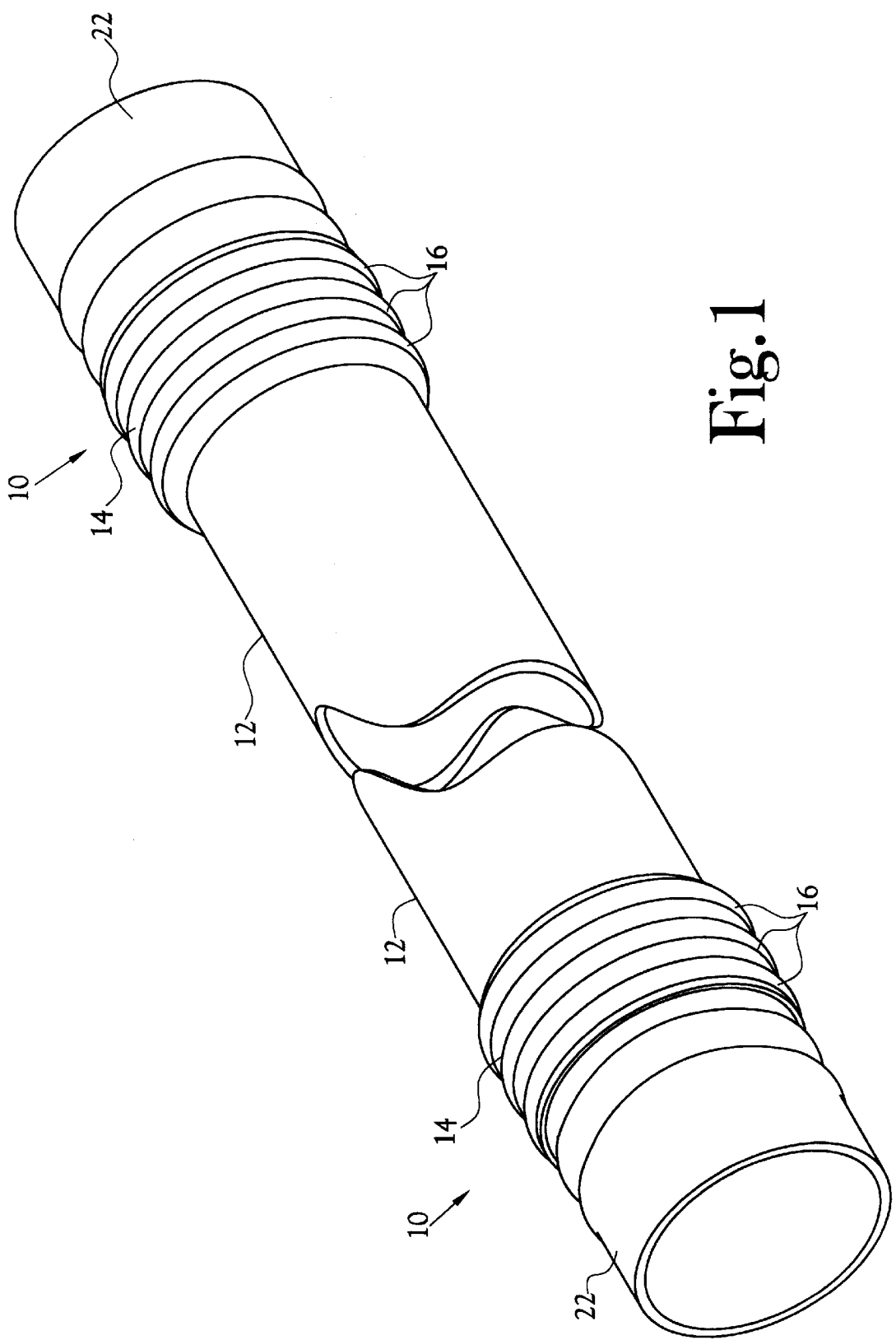
FIG. 1 is a perspective view a device for coupling a rigid pipe to a flexible hose constructed in accordance with several features of the present invention and installed on each end of a rigid pipe.

A device for coupling a rigid pipe to a flexible hose incorporating various features of the present invention is illustrated generally at 10 in the figures. The device for coupling a rigid pipe to a flexible hose, or coupling 10 is designed for coupling a rigid pipe 12 to a flexible hose 22.

In the preferred embodiment the coupling 10 is designed for use in low pressure applications and for relatively large diameter pipes 12 and hoses 22, whereby fluid communication between the rigid pipe 12 and the flexible hose 22 is prevented. The present invention also provides a method for fabricating and installing the coupling 10. For purposes of the present application, the flexible hose 22 is intended to include any type of flexible hose, including but not limited to a rubber hose, a flexible metal hose, and a bellows flex hose.

The coupling of the present invention includes a clamping ring 30. After assembly of the coupling 10 using the method of the present invention, a terminal end 24 of the flexible hose 22 is interposed between the terminal end 14 of the rigid pipe 12 and the clamping ring 30. In the embodiment illustrated in FIGS. 1–4, the clamping ring 30 is disposed within the interior 26 of the flexible hose 22, which is received within the rigid pipe terminal end 14. FIG. 1 illustrates a coupling 10 installed at both ends of a rigid pipe 12, such as might be used as a radiator hose in a transfer truck. It has been found that the coupling 10 of the present invention is useful in low pressure applications between zero and one hundred pounds per square inch (0–100 psi). Further, the coupling 10 has proven useful in applications for a flexible hose 22 having a diameter within a range of three-eighths inches to ten inches (3/8"–10"). It will be understood, however, that these ranges are exemplary only, and that the coupling 10 of the present invention may be used in other pressure ranges and with a flexible hose 22 having a diameter other than in the specified range.

Figure 2:
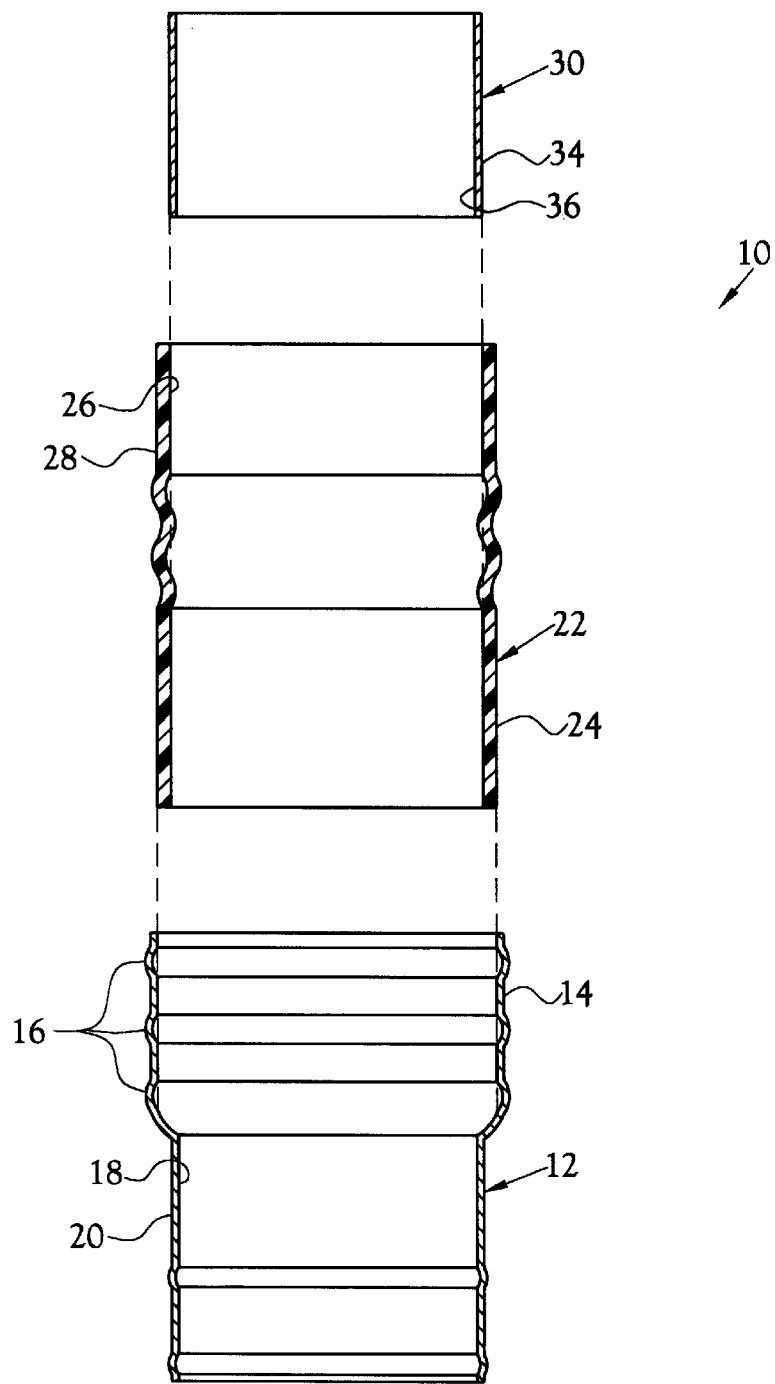
FIG. 2 illustrates an exploded side elevation view, in section, of the device or coupling a rigid pipe to a flexible hose, showing the various components prior to assembly thereof.

FIGS. 2–4 illustrate in progression the method of assembling the coupling 10 of the present invention. FIG. 2 illustrates an exploded view of a coupling 10 wherein the clamping ring 30 is disposed on the interior 26 of the flexible hose 22. The terminal portion 14 of the rigid pipe 12 defines an enlarged diameter for receiving the terminal end 24 of the flexible hose 22. To this extent, the outside diameter 28 of the flexible hose 22 is substantially equal to the inside diameter 18 of the enlarged portion of the rigid pipe terminal portion 14. Prior to insertion of the flexible hose 22, the terminal portion 14 of the rigid pipe 12 is deformed to define at least one annular ring 16. Illustrated are three such annular rings 16. However, any number of annular rings 16 may be formed as required for a particular application. The annular rings 16 are formed using a conventional rotary, segmented or in-line process. In the illustrated embodiment, the rigid pipe 12 and the clamping ring 30 are each fabricated from any ferrous or non-ferrous tubing, and the flexible hose 22 is fabricated from a polymer. Further, the flexible hose 22 may be define a braided construction, as required for a particular application. Further, as discussed above, the flexible hose 22 may be fabricated from a flexible metal or may define a bellow flex hose.

After the rigid pipe annular rings 16 are formed, the clamping ring 30 is inserted into the terminal end 24 of the flexible hose 22, and both are inserted into the rigid pipe terminal portion 14, as illustrated in FIG. 3. As illustrated, the outside diameter 36 of the clamping ring 30 is substantially equal to the inside diameter 26 of the flexible hose 22. Finally, as illustrated in FIG. 4, the clamping ring 30 is deformed to define at least one annular ring 32 to cooperate with each rigid pipe annular ring 16. As the clamping ring 30 is deformed, the flexible hose 22 is engaged and deformed into the cooperating annular ring 16 defined by the rigid pipe 12. Deformation of the flexible hose 22 between the rigid pipe annular rings 16 and clamping ring annular rings 32 serves to form a seal to prevent fluid communication between the rigid pipe 12 and flexible hose 22, and further prevents removal of the coupling 10.

Figure 5:
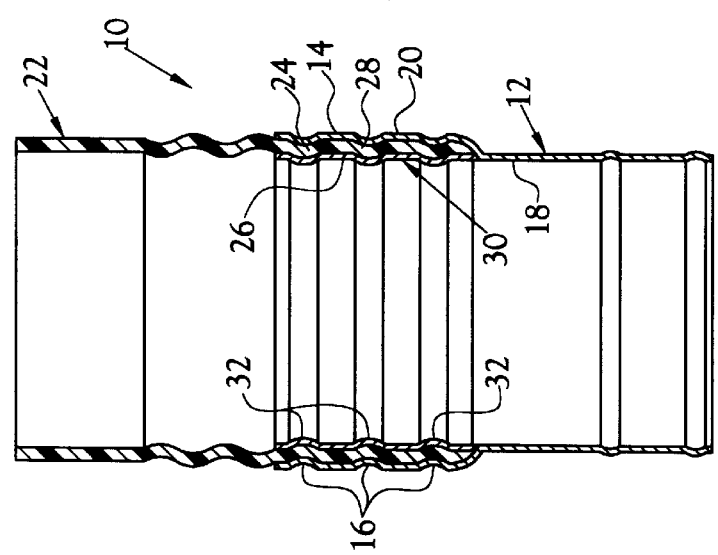
FIG. 5 illustrates an alternate embodiment of the device for coupling a rigid pipe to a flexible hose of the present invention.

FIG. 5 illustrates an alternate embodiment of the present invention, wherein the annular rings 16, 32 in both the rigid pipe 12 and the clamping ring 30 are formed inwardly. In this embodiment, the annular rings 32 are formed in the clamping ring 30 prior to insertion in the flexible hose 22. The flexible hose 22 is then inserted into the enlarged terminal portion 14 of the rigid pipe 12, and the annular rings 16 are then formed in the rigid pipe 12.

Figure 7:
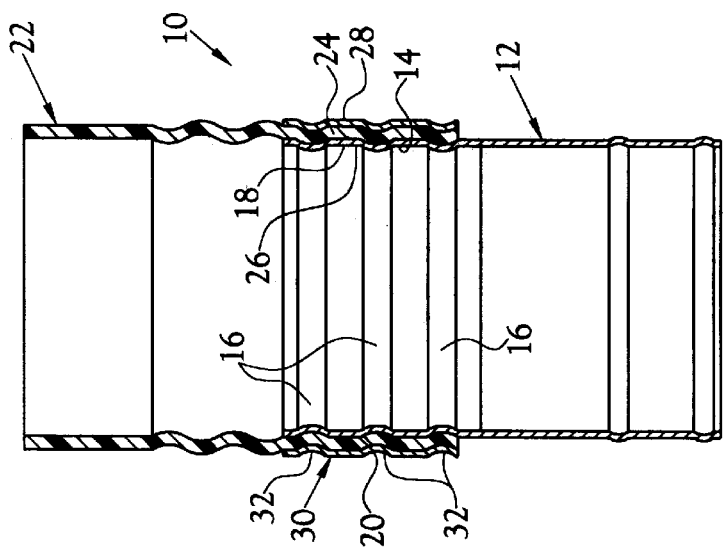
FIG. 7 illustrates a further alternate embodiment of the device for coupling a rigid pipe to a flexible hose of the present invention.
Figure 6:
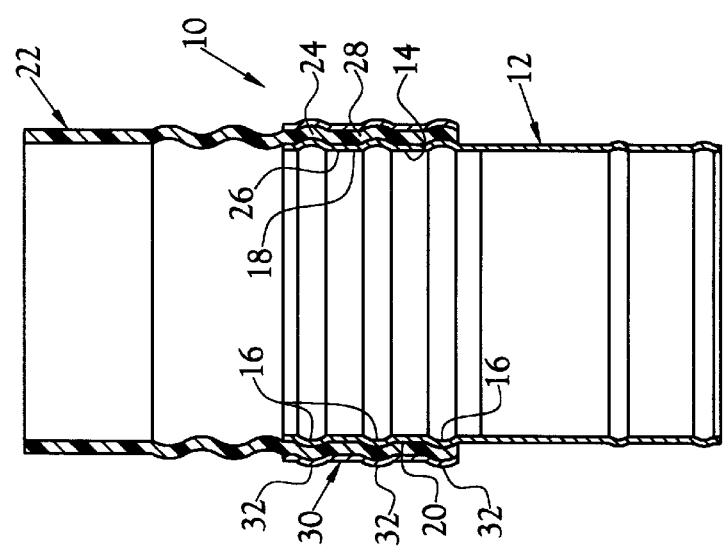
FIG. 6 illustrates another alternate embodiment of the device for coupling a rigid pipe to a flexible hose of the present invention.

FIGS. 6 and 7 illustrate two further embodiments of the present invention wherein the clamping ring 30 is disposed on the exterior 28 of the flexible hose 22, with the rigid pipe 12 being disposed on the interior 26 of the flexible hose 22. In each of these embodiments, the rigid pipe 12, prior to formation of the annular rings 16, defines a constant outside diameter 20 (no enlarged portion is required) substantially equal to the interior diameter 26 of the flexible hose 22. Further, the flexible hose outside diameter 28 is substantially equal to the clamping ring inside diameter 34. In FIG. 6, the annular rings 32, 16 of the clamping ring 30 and the rigid pipe 12 are formed outwardly. In this embodiment, the annular rings 32 are formed in the clamping ring 30 first. The terminal end 24 of the flexible hose 22 is then inserted into the clamping ring 30, and the terminal end 14 of the rigid pipe 12 is then inserted into the flexible hose 22. Finally, the rigid pipe 12 is deformed to define the annular rings 16 to cooperate with the clamping ring annular rings 32.

In the embodiment illustrated in FIG. 7, the annular rings 16, 32 of each of the rigid pipe 12 and the clamping ring 30 are formed inwardly. In this embodiment, the annular rings 16 are formed in the rigid pipe 12 first. The terminal portion 24 of the flexible hose 22 is then inserted into the clamping ring 30 and then over the rigid pipe 12. The annular rings 32 in the clamping ring 30 are then formed to cooperate with the rigid pipe annular rings 16.

Figure 8:
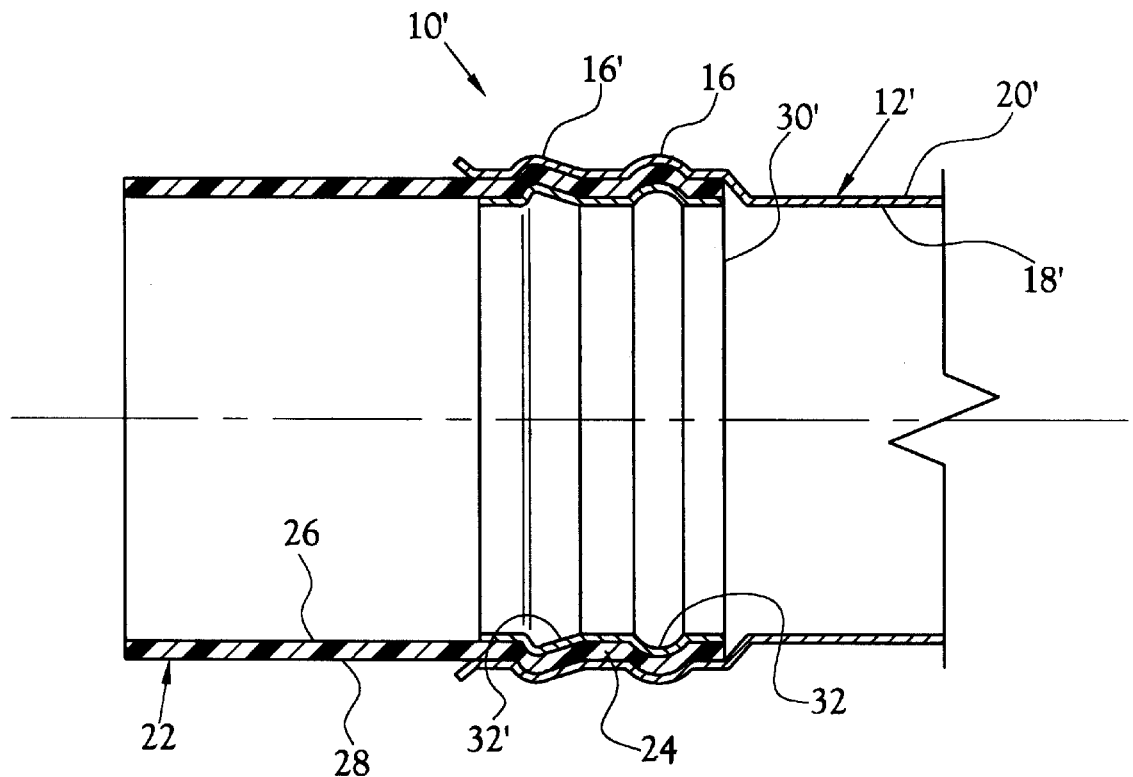
FIG. 8 illustrates a further alternate embodiment of the device for coupling a rigid pipe to a flexible hose of the present invention wherein a the rigid pipe and clamping ring are deformed to define an outwardly extending barbed bead.
Figure 9:
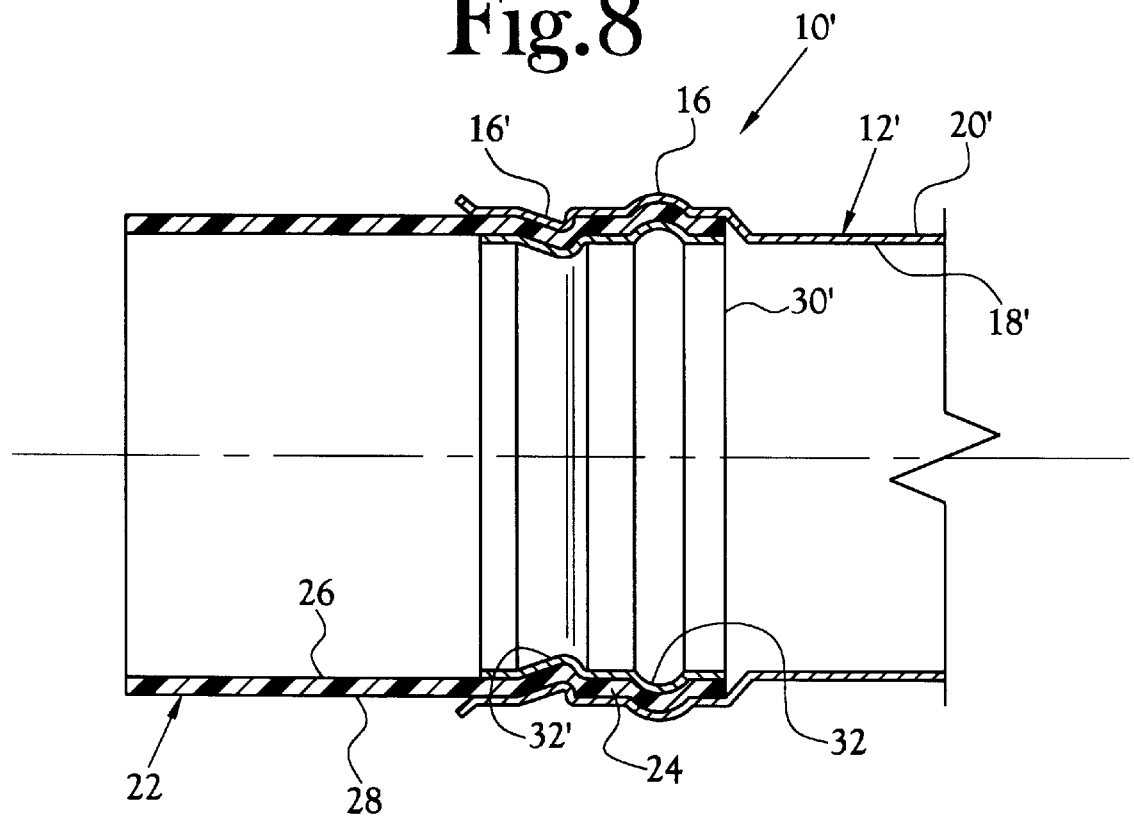
FIG. 9 illustrates a further alternate embodiment of the device for coupling a rigid pipe to a flexible hose of the present invention wherein a the rigid pipe and clamping ring are deformed to define an inwardly extending barbed bead.
Figure 10:
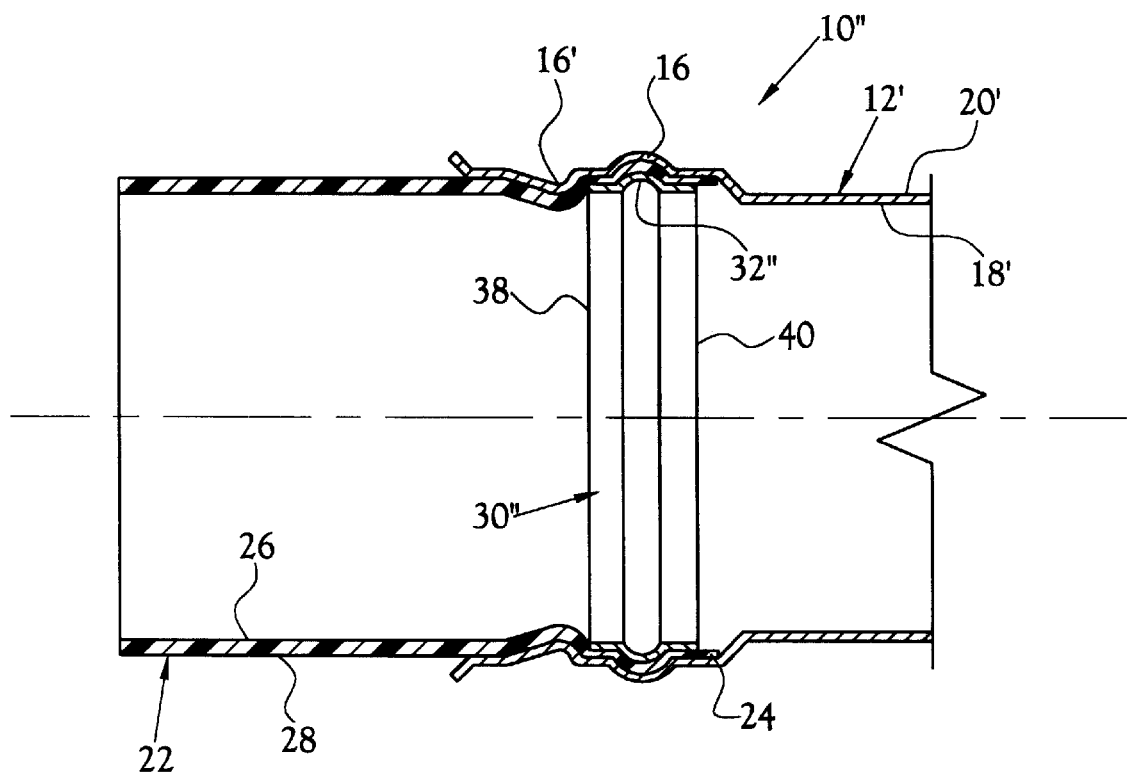
FIG. 10 illustrates a further alternate embodiment of the device for coupling a rigid pipe to a flexible hose of the present invention wherein a the rigid pipe is deformed below the clamping ring to define an inwardly extending barbed bead.

In the embodiments illustrated in FIGS. 8–12, at least the rigid pipe 12 is deformed to define a barbed annular ring 16'. In FIGS. 8 and 9, the clamping ring 30' is likewise deformed. In the remaining figures, the barbed annular ring 16' is formed proximate the leading edge 38 of the clamping ring 30", the trailing edge 40 of the clamping ring 30" being positioned proximate the terminal portion 24 of the flexible hose 22. As illustrated in FIGS. 8 and 9, the barbed annular bead 16' may be formed outwardly (see FIG. 8) or inwardly (see FIG. 9) when both the rigid pipe 12' and the clamping ring 30' are deformed. However, when only the rigid pipe 12' is deformed, the barbed annular ring 16' is formed toward the clamping ring 30". As illustrated, in FIGS. 10 and 11, the clamping ring 30" is disposed on the interior 26 of the flexible hose 22. Accordingly, the barbed annular ring 16' is deformed inwardly. However, although not illustrated, when the clamping ring 30" is disposed on the exterior 28 of the flexible hose 22 and the rigid pipe 12' is disposed within the flexible hose 22, the barbed annular ring 16' is deformed outwardly. As in the previous embodiments, when an annular ring 16 is formed in addition to a barbed annular ring 16', such annular ring 16 may be formed in either direction. For purposes of the present invention, the term "barbed" is intended to mean a distinct change in direction, as opposed to a gradually sloped curve. By providing a barbed annular ring 16', improved gripping between the rigid pipe 12, the flexible hose 22, and the clamping ring has been accomplished 30.

Figure 11:
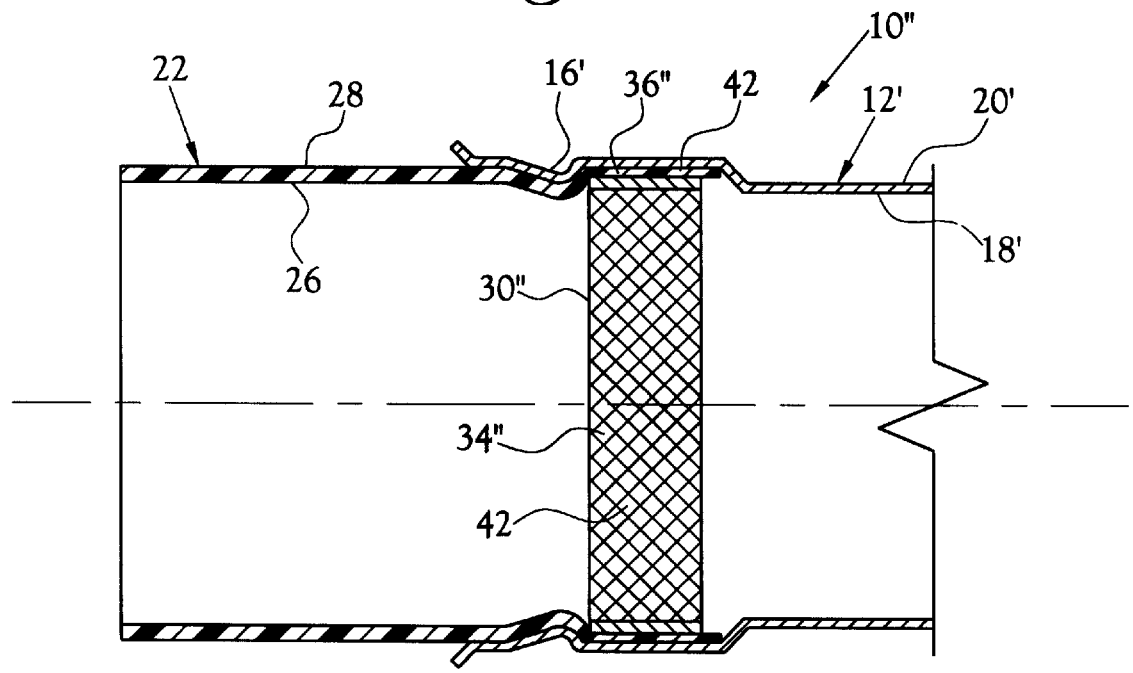
FIG. 11 illustrates a further alternate embodiment of the device for coupling a rigid pipe to a flexible hose of the present invention wherein a the rigid pipe is deformed below the clamping ring to define an inwardly extending barbed bead and wherein the clamping ring defines a knurled outer surface for increasing frictional resistance between the clamping ring and the flexible hose.
Figure 12:
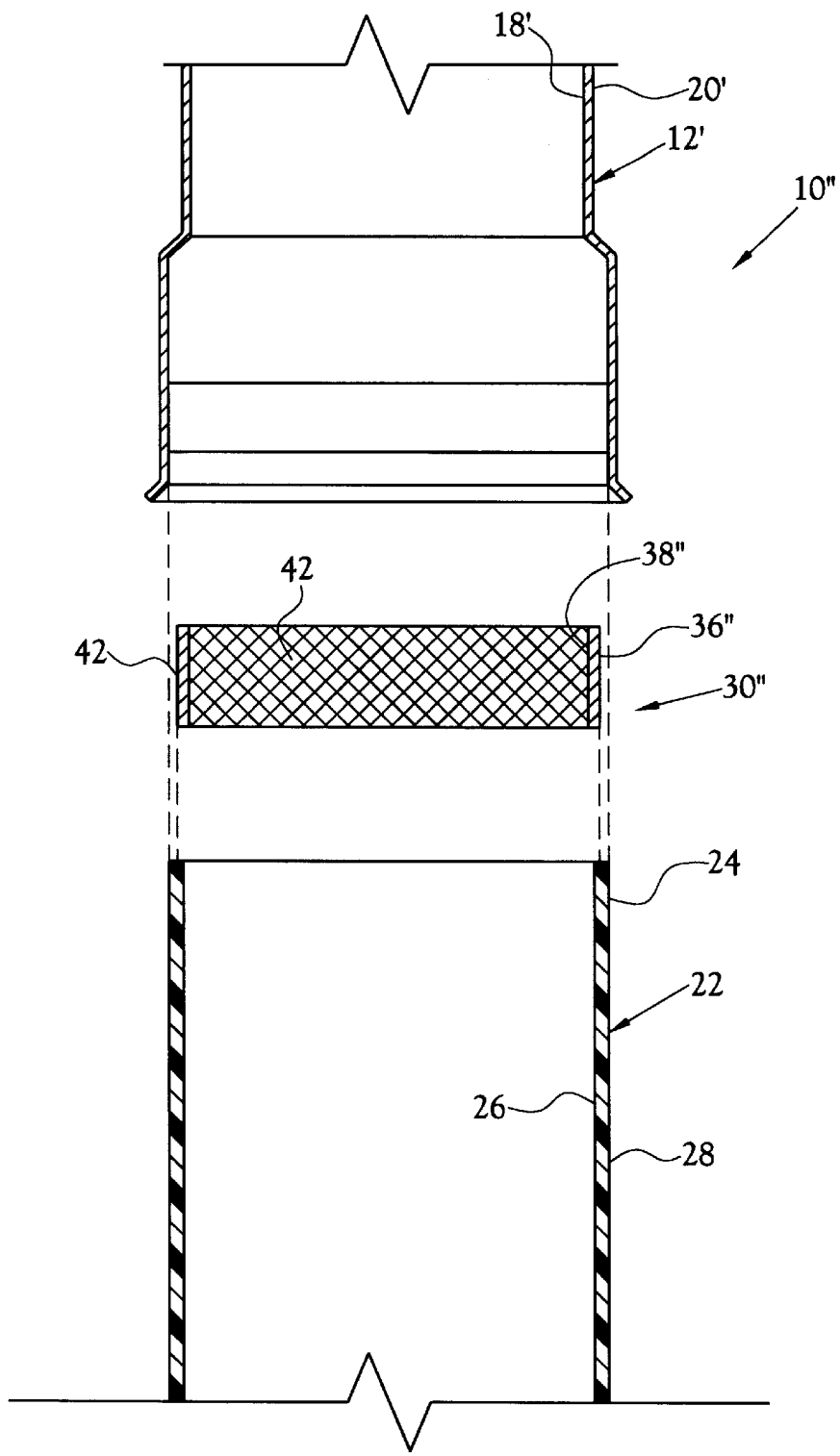
FIG. 12 is an exploded view of the embodiment of the device for coupling a rigid pipe to a flexible hose illustrated in FIG. 11.

In the embodiment illustrated in FIGS. 11 and 12, the exterior surface 36" of the clamping ring 30" defines a knurled surface 42, similar to that shown on the interior 34" of the clamping ring 30" for increasing frictional resistance between the clamping ring 30" and the flexible hose 22. For the embodiment wherein the clamping ring 30" is disposed on the exterior 28 of the flexible hose 22 and the rigid pipe 12' on the interior 26 thereof, the interior surface 34" of the clamping ring 30" is knurled.

In each of the above-described embodiments, it will be seen that the components are limited simply to a flexible hose 22 and rigid pipe 12 to be coupled, and a clamping ring 30 to accomplish the coupling 10. In each embodiment, both the rigid pipe 12 and the clamping ring 30 are deformed to define cooperating annular rings 16, 32 to deform the flexible hose 22 interposed there between. One of the rigid pipe 12 and the clamping ring 30 is deformed prior to assembly of the coupling 10, and the other is deformed after assembly. The order of deformation is dependant upon the direction of the deformation and the disposition of the rigid pipe 12 and the clamping ring 30. Specifically, for annular rings 16, 32 formed inwardly as illustrated in FIGS. 5 and 7, the inner of the rigid pipe 12 and clamping ring 30 is deformed first. For annular rings 16, 32 formed outwardly, as in FIGS. 1–4 and 6, the outer of the rigid pipe 12 and clamping ring 30 is deformed first.

From the foregoing description, it will be recognized by those skilled in the art that a device and method for coupling a rigid pipe to a flexible hose offering advantages over the prior art has been provided. Specifically, the device and method are provided for coupling a rigid pipe to a flexible hose. The coupling is designed for use in low pressure applications and for relatively large diameter pipes and conduits, whereby fluid communication between the rigid pipe and the flexible hose is prevented.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A device for coupling a rigid pipe to a flexible hose comprising:

a rigid pipe deformed at a terminal end to define at least one annular ring, said annular ring defining a barbed bead configuration projecting outward from a center of said rigid pipe and defining an exterior diameter;

a clamping ring defining a continuous ring configuration defining an interior diameter; and a flexible hose defining a terminal end configured to receive said rigid pipe terminal end and to be received within said clamping ring, said flexible hose being deformed to cooperate with said at least one rigid pipe annular ring, said flexible hose defining a compressed thickness, said clamping ring being disposed about a portion of said flexible hose, at least a portion of said clamping ring being disposed on an inboard side of and not overlapping said rigid pipe annular ring, said portion of said clamping ring disposed on said inboard side of said rigid pipe annular ring defining an interior diameter being less than a sum of said rigid pipe annular ring exterior diameter and said flexible hose compressed thickness, whereby said flexible hose is prevented from removal from between said rigid pipe and said clamping ring, whereby said clamping ring is prevented from passage over said rigid pipe annular ring for removal, and whereby fluid communication between said rigid pipe and said flexible hose is prevented.

2. The device of claim 1 wherein said clamping ring is deformed to define at least one barbed annular ring to cooperate with said at least one rigid pipe barbed annular ring.

3. The device of claim 1 wherein said clamping ring defines an inner knurled surface to enhance engagement of said clamping ring and said flexible hose.

4. A device for coupling a rigid pipe to a flexible hose comprising:

a rigid pipe deformed at a terminal end to define at least one annular ring, said annular ring defining a barbed bead configuration projecting inward from a center of said rigid pipe and defining an interior diameter;

a clamping ring defining a continuous ring configuration defining an exterior diameter; and a flexible hose defining a terminal end configured to be received within said rigid pipe terminal end and to receive said clamping ring, said flexible hose being deformed to cooperate with said at least one rigid pipe annular ring, said flexible hose defining a compressed thickness, said clamping ring being disposed about a portion of said flexible hose, at least a portion of said clamping ring being disposed on an inboard side of and not overlapping said rigid pipe annular ring, said rigid pipe annular ring interior diameter being less than a sum of said flexible hose compressed thickness and an exterior diameter defined by said portion of said clamping ring disposed on said inboard side of said rigid pipe annular ring, whereby said flexible hose is prevented from removal from between said rigid pipe and said clamping ring, whereby said clamping ring is prevented from passage over said rigid pipe annular ring for removal, and whereby fluid communication between said rigid pipe and said flexible hose is prevented.

5. The device of claim 4 wherein said clamping ring is deformed to define at least one barbed annular ring to cooperate with said at least one rigid pipe barbed annular ring.

6. The device of claim 4 wherein said clamping ring defines an outer knurled surface to enhance engagement of said clamping ring and said flexible hose.

* * * * *